Patented July 13, 1937

2,086,536

UNITED STATES PATENT OFFICE 2,086,536

PROCESSING ARTICHOKE TUBER

Leo M. Christensen and Ralph M. Hixon, Ames, Iowa, assignors to The Chemical Foundation, Incorporated, a corporation of Delaware No Drawing. Application December 14, 1935, Serial No. 54,372

3 Claims. (Cl. 99—205)

The object of our invention is to overcome the natural obstacles to intensive industrial development of the manufacture of products such as sugars, alcohols, acids and other chemicals obtainable from the utilization of constituent materials derivable from the Jerusalem artichoke (*Helianthus tuberosus*); and, in furtherance of this object, to provide means whereby such materials may be extracted, concentrated and preserved without loss of the essential qualities which make them valuable as source materials ready for treatment in the several ways by which, as present in the diffusion liquor of this tuber, they may be processed for useful application in the arts.

With such object in view, our invention consists in certain methods of treatment of the tuber as hereinafter described.

The Jerusalem artichoke is a native North American plant, a number of varieties of which may be found in many sections of the continent. It is a very hardy plant and shows an unusual ability to withstand drought and hot dry winds which seriously affect most of the present major crops, particularly in the West Central States. This crop is therefore of great interest to American agriculture.

The plant produces an abundant top growth, stalks 9 to 12 feet in height being common. During the late summer, tubers begin to form and by the time of frost have reached a size of small potatoes. When the top has been killed by freezing, or in frost-free districts has reached maturity, the sugars present are translocated to the tubers, which continue to grow for two to three weeks after the death of the tops. The tubers may then be harvested or may be kept in the ground to be harvested during the winter or spring.

The tubers can be kept only a short time after removal from the ground because of the very thin skin and because they ferment very readily.

These tubers ordinarily contain about 75 per cent. of water. The better varieties contain 16 to 20 per cent. of sugar yielding substances, largely in the form of polysaccharides but including some levulose and dextrose. These polysaccharides are less complex than is inulin or starch and are readily converted to the monoses by hydrolysis with dilute acids or by enzymes contained in the juice from macerated artichoke tubers. They are readily soluble in warm water and may be removed by diffusing the sliced tubers with water at a temperature of 70° C. to 80° C. in much the same way that sucrose is removed from sugar beets.

This diffusion liquor contains about 15 per cent. of total solids, of which 12 per cent. consists of sugars or sugar-yielding substances, with about three per cent. of protein and minerals. This liquor may be used directly for fermentation. Thus, it may be inoculated with a suitable yeast and the carbohydrates converted to alcohol, or with *Clostridium acetobutylicum* to yield butanol, acetone and ethanol. Usually in the latter case the addition of corn, corn gluten meal, soy bean protein, or other adjuvant food materials is desirable. Lactic acid, acetic acid, propionic acid, butyric acid, 2,3-butylene glycol, citric acid, and other products, may also be made from this liquor by inoculation with the proper microorganism, following methods known to those skilled in the art.

With some of the microorganisms, or particularly certain varieties, it is desirable to hydrolyze the polysaccharides present with dilute acids, prior to inoculation. This can best be accomplished by adjusting the reaction to about pH 1.5 to 1.7 and heating 30 to 60 minutes at 80° C. to 100° C. The acid should then be neutralized with a suitable base to the reaction suitable for the organism used.

The juice may also be used for the manufacture of levulose and dextrose, following methods known to those skilled in the art.

The principal obstacle in these industrial developments has been the great cost which results from the seasonal operation made necessary by the poor keeping qualities of the tubers. Ordinarily fresh tubers are not available during more than six months of the year, so that the factory must stand idle at least one-half of the time, resulting in great economic loss.

We have found that if proper conditions are maintained, the liquor from the diffusion battery may be evaporated and stored for use during the season when fresh tubers are not available, and that this syrup may be used with excellent results in the processes described above, thus greatly lowering the cost of producing the articles listed.

The following is a description of the manner by which we carry our process into operation:

The diffusion liquors, containing about 15 per cent. of total solids, are adjusted to a reaction of pH 3.5 to 7.5, preferably pH 5.0, by adding acid or base, as may be required. Ordinarily the liquor naturally has a reaction of nearly pH 5.0. The liquor is then evaporated in a suitable evaporator, preferably in multiple effect, to a concentration of 50 to 80 per cent. total solids. If the total solids are much under 50 per cent., the syrup does not keep well, and if over 80 per cent., it becomes too thick to handle without trouble. During this evaporation, it is essential to maintain temperatures of not more than about 120° C. in the first effect, and not more than about 90° C. in the last effect. If proper temperature and reaction are not maintained, serious sugar decomposition may result.

Syrup carefully prepared in this manner may be stored in steel tanks and used as required, thus making year-round factory operation practicable.

Having thus described our invention, we claim:

1. The process of preservation of the diffusion liquors obtainable from the tubers of the *Helianthus tuberosus*, consisting in adjusting same to a reaction of pH 3.5 to 7.5; concentrating same to a consistence of 50 to 80 per cent. total solids, while maintaining the temperature at not more than about 120° C.; reducing the temperature to not more than about 90° C.; storing the concentrated liquors and maintaining them at the reduced temperature during storage.

2. In the process of preserving artichoke-tuber diffusion liquors, the steps consisting in adjusting same to a reaction of pH 3.5 to 7.5; evaporating same to a concentration between 50 to 80 per cent. total solids, and maintaining the temperature below 120° C. during evaporation.

3. The process of preserving artichoke-tuber diffusion liquors consisting in adjusting the same to a reaction of about pH 5.0, raising the temperature of the diffusion liquor to a point below and about 120° C.; evaporating same in multiple effect to a concentration between substantially 50 to substantially 80 per cent total solids, and maintaining the temperature at not more than about 120° C. during the first effect, and at not more than 90° C. in the last effect.

LEO M. CHRISTENSEN.
RALPH M. HIXON.